United States Patent [19]
Kato et al.

[11] Patent Number: 4,482,231
[45] Date of Patent: Nov. 13, 1984

[54] LIGHT-INTERCEPTING BLADE FOR A LIGHT CONTROL DEVICE

[75] Inventors: Hironobu Kato, Urawa; Masaru Ichikawa; Atsushi Sano, both of Yokohama; Yoshiaki Tanabe, Kawasaki; Yoshiyuki Nakano, Tokyo, all of Japan

[73] Assignee: Nippon Kogaku K.K., Tokyo, Japan

[21] Appl. No.: 476,936

[22] Filed: Mar. 21, 1983

[30] Foreign Application Priority Data

Mar. 31, 1982 [JP] Japan .................................. 57-52553

[51] Int. Cl.³ .............................................. G03B 9/40
[52] U.S. Cl. .................................... 354/246; 354/270
[58] Field of Search ........ 354/226, 241, 242, 246–250, 354/261, 264, 270, 274; 350/266, 271

[56] References Cited

U.S. PATENT DOCUMENTS

| | | | |
|---|---|---|---|
| 4,276,954 | 7/1981 | Romano | 181/287 X |
| 4,298,265 | 11/1981 | Tanaka et al. | 354/246 |
| 4,394,082 | 7/1983 | Senuma et al. | 354/246 |
| 4,401,380 | 8/1983 | Sato et al. | 354/245 X |

FOREIGN PATENT DOCUMENTS

| | | | |
|---|---|---|---|
| 1828597 | 1/1961 | Fed. Rep. of Germany | 354/250 |
| 2105809 | 12/1971 | Fed. Rep. of Germany | 354/241 |

*Primary Examiner*—John Gonzales
*Attorney, Agent, or Firm*—Fitzpatrick, Cella, Harper & Scinto

[57] ABSTRACT

A planar light-intercepting blade adapted to be moved in the direction of surface thereof at a position across the optical path of an optical device to thereby control the quantity of light passing through the optical path comprises a pair of outer layers forming the outer surfaces of the blade, and an inner layer formed between the outer layers and having a number of spaces therein.

16 Claims, 11 Drawing Figures

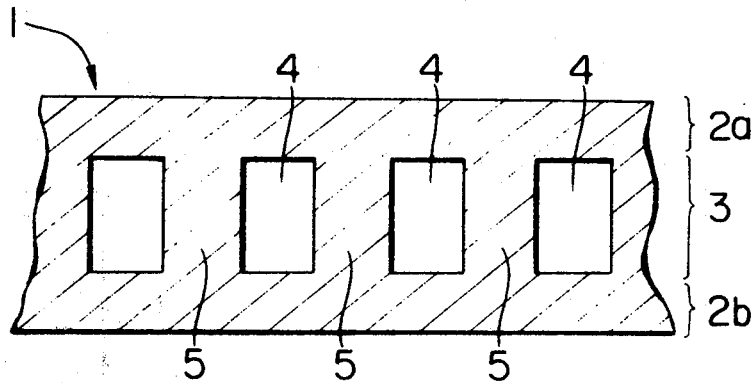

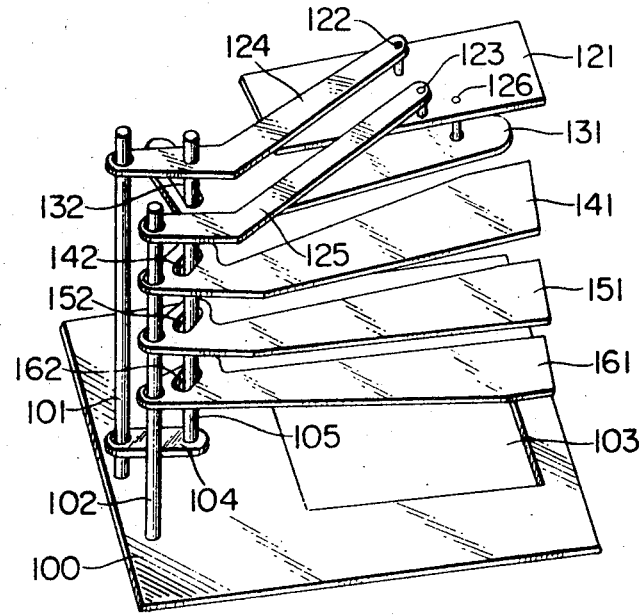

MISSING PAGE TEMPORARY NOTICE

PATENT # 4482231 FOR ISSUE DATE 11-13-84

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 1

MISSING PAGE TEMPORARY NOTICE

PATENT # 4482231 FOR ISSUE DATE 11-13-84 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 2

MISSING PAGE TEMPORARY NOTICE

PATENT # 4482231 FOR ISSUE DATE 11-13-84 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 3

MISSING PAGE TEMPORARY NOTICE

PATENT # 4482231 FOR ISSUE DATE 11-13-84

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 4

MISSING PAGE TEMPORARY NOTICE

PATENT # 4482231  FOR ISSUE DATE 11-13-84

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 5

MISSING PAGE TEMPORARY NOTICE

PATENT # 4482231  FOR ISSUE DATE 11-13-84

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 6

MISSING PAGE TEMPORARY NOTICE

PATENT # 4482231 FOR ISSUE DATE 11-13-84

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 7

MISSING PAGE TEMPORARY NOTICE

PATENT # 4482231 FOR ISSUE DATE 11-13-84 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 8

MISSING PAGE TEMPORARY NOTICE

PATENT # 4482231 FOR ISSUE DATE 11-13-84

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 9

MISSING PAGE TEMPORARY NOTICE

PATENT # 4482231    FOR ISSUE DATE 11-13-84

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 10

MISSING PAGE TEMPORARY NOTICE

PATENT # 4482231         FOR ISSUE DATE 11-13-84

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 1

LIGHT-INTERCEPTING BLADE FOR A LIGHT CONTROL DEVICE

BACKGROUND OF THE INVENTION

1. Field of the Invention

This invention relates to a light-intercepting blade which is required to move at a high speed, such as the shutter blades or the diaphragm blades of the focal plane shutter or the lens shutter of a camera.

2. Description of the Prior Art

Focal plane shutter blades are required to move at a high speed to secure the simultaneity of the exposures in the various portions of the photographing picture plane, and a diaphragm blades is required to move at a high speed to reduce the rate of the stop-down time in the time required for the photographing sequence of the camera. As a method for realizing high-speed movement of the light-intercepting blade, it would occur to mind to increase the amount of operating force, but this would increase the energy required for the operation for storing the amount of force and, in case of manual operation, would give the sense of displeasure to the operator and, in case of electric operation, would increase the power consumption of the motor.

Further, in this method, the shock force applied to the blade itself at the start or end of the movement is great and thus, this method is disadvantageous in durability as well.

As another method, it would occur to mind to reduce the weight of the light-intercepting blade. However, there is a limit in reducing the thickness of the blade because mechanical strength such as rigidity necessary as a light-intercepting blade must be maintained and the planarity of the blade must be secured. For this reason, it has been attempted to reduce the weight of the blade by partly thinning the surface of the blade instead of thinning the entire blade. In this case, however, the surface of the blade is uneven and this is liable to cause a concentrated stress. Also, where several such blades are used to form a shutter, there is a danger that light may leak in the portion wherein the blades overlap each other. To eliminate these disadvantages, special contrivance is required in the combination and overlapping of the blades, and this is turn renders design and manufacture combersome.

SUMMARY OF THE INVENTION

It is an object of the present invention to provide a light-intercepting blade for a light control device which has smooth surfaces and has a sufficient thickness to provide necessary mechanical strength and which is reduced in weight.

The flexural rigidity in the mechanical properties is a particularly important property, and to impart the flexural rigidity rationally, the present invention adopts the idea of composite material design. The flexural rigidity is expressed by the product of the modulus of longitudinal elasticity E and the geometry of inertia Iz, and indicates the magnitude of resistance relative to the bending movement. Here, E is a value determined by the material itself and Iz is a value determined by the shape and dimensions of the cross-section.

Paying attention to the cross-sectional structure of the blade, to make it greater, the thickness and width of the blade can be increased, but an increased thickness leads to the disadvantages that (1) the weight of the blade is increased, (2) the distance from the surface of the blade which contacts a driving mechanism to the center of gravity of the blade is increased to aggravate the balance during movement of the blade, and (3) the space for containing the blade becomes larger, and an increased width leads to the disadvantages that (1) the weight of the blade is increased and (2) it becomes difficult to secure the planarity of the blade. Also, the length of the blade is limited by the size of the aperture for exposure. Accordingly, particularly in the shutter of a camera, it cannot be expected that the dimensions of the existing blade are greatly changed.

Therefore, the idea of removing a predetermined volume becomes high-lighted as the means for reducing the weight of the blade. If the same area is removed in the transverse cross-section of the blade, the reduction in Iz will be smaller when the portion close to the neutral axis with respect to the bending stress is removed than when the portion remote from the neutral axis with respect to the bending stress is removed. That is, to reduce the weight of the blade without reducing Iz as much as possible, it is desirable that the inner layer near the neutral axis of the blade be partly thinned.

The light-intercepting blade of the present invention is characterized in that it has hollow portions in the inner layer thereof.

In a sheet member forming the light-intercepting blade of the present invention, both the inner layer and outer layers may be integrally formed of the same substance, and the sheet member of such structure can be manufactured as by foam shaping.

Usually, however, such sheet member is manufactured by joining at least two members divided in the direction of thickness thereof. In the latter case, the outer layers and inner layer may be of discrete materials and each layer need not always comprise a single layer but may be multiple layers of the same material or different materials. Further, the entire sheet member may be formed of the same material or different materials and the surface of the sheet member having a hollow structure may be reinforced by a post-treatment such as anode oxidation treatment, nitrogenization treatment, boronization treatment or alloying, whereby part or the whole of the outer layers in one or both of the direction of thickness of the sheet and the direction of surface of the sheet may be changed in quality. The aforementioned post-treatment may reach not only the outer layers but also the inner layer.

The invention will become more fully apparent from the following detailed description thereof taken in conjunction with the accompanying drawings.

BRIEF DESCRIPTION OF THE DRAWINGS

FIG. 1 is a fragmentary cross-sectional view of a sheet member used in Embodiment 1.

FIG. 2A is a plan view of a light-intercepting blade mode in accordance with Embodiment 2.

FIG. 2B is a cross-sectional view taken along line II—II of FIG. 2A.

FIG. 3 ia a cross-sectional view of a light-intercepting blade made in accordance with Embodiment 3.

FIG. 4 is a perspective view of a composite sheet member made in accordance with Embodiment 3.

FIG. 5 is a graph showing the relation between the ratio of thickness of the outer sheet and the inner sheet of the composite sheet member of FIG. 4 and the modulus of bending elasticity thereof.

FIG. 6 is a developed perspective view of a focal plane shutter.

FIG. 7A is a plan view of a shutter blade used in Embodiment 7.

FIG. 7B is a cross-sectional view taken along line VII—VII of FIG. 7A.

FIG. 8A is a plan view of a shutter blade used in Embodiment 8.

FIG. 8B is a cross-sectional view taken along line VIII—VIII of FIG. 8A.

DESCRIPTION OF THE PREFERRED EMBODIMENTS

Some embodiments of the present invention will hereinafter be described with reference to the drawings.

Embodiment 1

FIG. 1 shows a sheet member used in the present embodiment. The sheet member 1 comprises outer layers 2a, 2b and an inner layer 3 including a number of ribs 5 for creating a number of hollow portions 4. Describing an example of the method of making such a plate member, a sheet may be divided between the outer layer 2a and the inner layer 3, whereby a member constituting the outer layer 2a and a member constituting the inner layer 3 and the outer layer 2b integrally may be made separately, and then the two members may be joined with each other. For example, two beryllium metal sheets may be prepared, a number of recesses may be formed in one side (the side to be joined) of one of the metal sheets, and the two sheets may be joined with each other as by the diffusion joining method. Alternatively, a number of recesses may be formed in one surface of each of two metal sheets and the surfaces may be joined with each other. Rolling, scribing by a laser, or partial etching using a mask may be used to form the recesses in the metal sheets.

The diffusion joining method can be applied not only to beryllium but also to metals such as aluminum alloy and magnesium alloy, and the joining of the present embodiment is excellent in intimate contact because it is the joining between identical substances, and there is little possibility of warping or torsion after the joining because the two substances have the same coefficient of thermal expansion.

The material used is not limited to the abovementioned metals but may be low Z ceramics shown in Table 1 below or other inorganic substances. For example, low Z ceramics can be joined together by the sintering joining method. However, these substances are insufficient in toughness and shock resistance and therefore, as required, they may preferably be coated with plastics or rubber to prevent creation of cut-aways or otherwise protect the surface thereof.

The sheet member thus obtained is cut into a necessary shape to obtain a light-intercepting blade having a thickness of about 0.1 mm. If at this time the hollow portion is cut, the end surface will become uneven and therefore, to avoid this, design is made in advance such that the hollow portion lies inside the necessary shape, or a member of the necessary shape is made earlier, whereafter the two members are joined together, whereby a light-intercepting blade may be made.

Embodiment 2

The light-intercepting blade 11 of the present embodiment shown in FIGS. 2A and 2B is formed by joining a sheet 15, having a uneven surface, which constitutes one outer layer and the inner layer and a planar sheet 16 which constitutes the other outer layer. The light-intercepting blade 11 is formed with small apertures 17 into which may be inserted pins for connecting a driving mechanism, not shown, to the blade.

The sheet 15 may be formed, for example, of an aluminum alloy, and the planar sheet 16 may be formed, for example, of alumina ($Al_2O_3$). Both sheets 15 and 16 contain the same element, aluminum, and the joining strength thereof is relatively great.

Embodiment 3

As is shown in FIG. 3, both outer layers are formed by planar sheets 25 and 26 of the same substance and the inner layer is formed by an inner sheet 27 of a different substance from the outer layers which has cutout or hollow portions 24. Since the inner layer has the hollow portions 24 extending therethrough in the direction of the thickness thereof, light interception must be effected in the same layers, and therefore a material abundant in light-intercepting property must be used for the planar sheets 25 and 26.

On the other hand, paying attention to the modulus of longitudinal elasticity E which is another factor of the flexural rigidity, it is more effective to enhance the flexural rigidity if the material of greater E is disposed at a location remote from the neutral axis of the blade. Accordingly, to achieve a lighter weight, it is effective to reduce the volume ratio of the outer layers in the entire blade and increase the volume ratio of the inner layer including the hollow portions, and to increase the flexural rigidity, it is desirable to form the outer layers of a material whose relative modulus of elasticity (the modulus of elasticity divided by the specific gravity) is great.

The roles of the outer layers and inner layer become clear from this fact. The outer layers must bear almost all of the strength of the entire blade and must be provided with a light-intercepting ability. Wear resistance and weather resistance are also required of them. On the other hand, the inner layer is a binder or a spacer which couples the outer layers of the opposite surfaces at a predetermined interval, and as far as there is no problem in the joining of the outer layers, if a great volume is removed, the entire blade will become correspondingly lighter in weight.

The materials shown in Table 1 below are preferable as the materials having a light-intercepting property and a high relative modulus of elasticity which are applicable to the outer layers.

TABLE 1

Properties of low Z ceramics, inorganic materials and metals

| Substance | Property | | |
|---|---|---|---|
| | Density ($g/cm^3$) | Modulus of elasticity ($kgf/mm^2$) | Relative modulus of elasticity $\left(\dfrac{kgf/mm^2}{g/cm^3}\right)$ |
| BN | 1.90 | $9 \times 10^3$ | $4.7 \times 10^3$ |
| $B_3N_4$ | 2.10 | 11 | 5.2 |
| $B_4C$ | 2.50 | 46 | 18 |
| $Si_3N_4$ | 3.18 | 39 | 12 |
| SiC | 4.09 | 50 | 12 |
| AlN | 3.26 | 9 | 2.8 |
| $Al_2O_3$ | 3.96 | 43 | 11 |
| TiN | 5.43 | 25 | 4.6 |
| C | 1.50 | 21 | 14 |
| B | 2.63 | 39 | 15 |
| Be | 1.84 | 27 | 15 |

TABLE 1-continued

| | Properties of low Z ceramics, inorganic materials and metals | | |
|---|---|---|---|
| | | Property | |
| Substance | Density (g/cm$^3$) | Modulus of elasticity (kgf/mm$^2$) | Relative modulus of elasticity $\left(\dfrac{\text{kgf/mm}^2}{\text{g/cm}^3}\right)$ |
| Mg alloy | 1.80 | 5 | 2.8 |

Many of substances having a high relative modulus of elasticity are elements of low Z and compounds thereof. Magnesium alloy has not so high a relative modulus of elasticity, but can be rolled into sheets and also permits surface treatment such as anode oxidation and thus, it is a useful material.

On the other hand, as the material of the inner layer having a low density, use may be made of polyolefine resin such as poleyethylene, polypropylene or polybutylene or plastics such as polyethylene terephthalate, polybutylene terephthalate, polyvinyl chloride, polyamide, polyimide, polyurethane or epoxy resin which may preferably be used also as an adhesive agent.

Description will now be made of the method of making the blade of the third embodiment. Boron carbide (B$_4$C) is used for outer sheets 25 and 26, and epoxy resin particularly excellent in adhesive property is used for inner sheet 27. First, the sheets 25 and 26 are made by the use of the hot press method or an evaporating method such as CVD or PVD, and then with one sheet 25 as the substrate, the inner sheet 27 having a pattern for a hollow structure is formed on the substrate by screen printing or an evaporating method using a mask (for example, plasma polymerization), and finally the other sheet 26 is joined to the sheet 25. Or alternatively, one outer sheet 25 may be accumulated on the inner sheet which has not yet been thinned, by the use of vacuum evaporation, whereafter the inner sheet may be thinned to form an inner layer. Another method is to join two outer sheets 25 and 26 with the inner sheet 27 interposed therebetween, the inner sheet having been thinned by machining. As the inner sheet 27, use may also be made of an aligned fiber-like, textile-like or foam-like material.

Next, the degree of light weight and the modulus of bending elasticity achieved in the present embodiment will be calculated. A composite sheet member 31 as shown in FIG. 4 is formed by using B$_4$C (density=2.5 g/cm$^3$, E=20,000 kgf/mm$^2$) as the outer sheets and epoxy resin of hollow structure (where 50% of volume has been removed, apparent density=0.8 g/cm$^3$, E=200 kgf/mm$^2$) as the inner sheet. Generally, the outer sheets 32a and 32b are equal in thickness. The modulus of bending elasticity (kgf/mm$^2$) of the composite sheet member calculated with the ratio of the total thickness of the outer sheets 32a, 32b to the thickness of the inner sheet 33 changed is as shown in the graph of FIG. 5.

By using this composite sheet member 31 to form the opening curtain and closing curtain of the focal plane shutter device of a camera, the shortest exposure time (the highest shutter speed that can provide a fully open condition to the aperture for exposure) synchronizable with the light emission of an electronic flash unit can be easily shortened. For example, in order that the above-mentioned synchronizable exposure time may be shortened to 1/250 sec. without the amount of shutter setting force (74.6 gr) of the conventional camera being changed, the density of the blade must be about 1.48 g/cm$^3$ or less while, from experience, the modulus of bending elasticity of the blade must be 8,000 kgf/mm$^2$ or more. Accordingly, it is seen from the graph of FIG. 5 that a composite sheet member in which the ratio of (the total thickness of the outer sheets)/(the thickness of the inner sheet) is 4/6 to 1.5/8.5 is suitable as the material of the shutter curtains.

Even if the material of the outer and inner sheets is changed to said other material, the composite sheet member has a mechanical characteristic similar to the graph of FIG. 5 and therefore, the synchronizable exposure time of 1/250 sec. by the conventional amount of shutter setting force can be achieved by making the ratio of the total thickness of the outer sheets/the thickness of the inner sheet substantially equal to what has been shown above.

Embodiment 4

In a construction wherein, as in FIG. 3, an inner sheet formed with apertures for creating a hollow structure is sandwiched between two outer sheets, titanium foil having a thickness of 10 μm is used as the outer sheets, carbon fiber reinforced plastics (CFRP) having a thickness of 40 μm is used as the inner sheet, and epoxy resin contained in a preimpregnation sheet itself which is the predecessor of CFRP is utilized for the joining of the sheets. This CFRP is carbon fiber impregnated with thermosetting resin such as epoxy resin or unsaturated polyester as the binder and, in the present embodiment, CFRP in which the mixture ratio (vol. %) of carbon fiber/resin is 75/25 to 50/50 is suitable. The specific gravity of CFRP in this range is 1.58 to 1.65, which is considerably lower than the specific gravity of titanium or aluminum and is a value substantially comparable to that of a plastic simple substance. The preimpregnation sheet is carbon fiber impregnated with resin in uncured B stage state and, if use is made of a preimpregnation sheet in which carbon fiber is uniform in one direction, it will be easy to obtain a hollow structure by cutting such sheet in the direction of fiber and making it into thin band-like members and arranging these band-like members at intervals.

To obtain a light-intercepting blade, the preimpregnation sheets are placed at predetermined intervals on the titanium foil and another titanium foil is superposed thereon, and then such assembly is heated in an electric furnace of 130° C. for 90 minutes while it is being pressed with a pressure of 5–7 kg/cm$^2$ to increase the joining strength thereof, whereby a composite member having hollow portions in the inner layer thereof is obtained. The light-intercepting blade obtained by punching this composite member sufficiently satisifies the standard value of planarity of 0.1 mm or less required of the usual shutter blade.

As the material of the outer layers, use may be made of not only titanium foil but also foil of a metal having a relatively great relative modulus of elasticity and a light-intercepting property, such as aluminum, aluminum alloy, titanium alloy, beryllium or beryllium alloy. Further, to enhance the light-intercepting property, a layer of lubricative black coating material may be provided on the surface of such metal foil.

Also, before the preimpregnation sheet is joined to the outer layers, it may be presscured and the CFRP thus obtained may be joined to the outer layers by the use of other adhesive agent.

Embodiment 5

The outer layers are formed by CFRP and the inner layer is formed by metal foil or plastic film having a number of holes therethrough. Where a metal is used for the inner layer, the metal may preferably be a light metal such as titanium, titanium alloy, aluminum, aluminum alloy, beryllium or beryllium alloy. Where plastics is used for the inner layer, it may preferably be a plastics having a great tensile strength, such as celluloid, cellulose acetate, polyethylene, polypropylene, polyvinyl chloride, polystyrene, polyethylene terephthalate, polycarbonate, Nylon or polyimide.

The thickness of the outer layers may sufficiently be, for example, 25 $\mu$m, and the thickness of the inner layer may sufficiently be, for example, 10 $\mu$m.

In the case of the present embodiment, light must be intercepted by the outer layers. CFRP has a light-intercepting property in itself, but for the purpose of more complete light interception, black dye or carbon particles are added to the resin, or CFRP is dyed in black, or a layer of black coating material is provided on the front or the back side of CFRP.

Embodiment 6

The composite sheet member of Embodiment 3 is applied to each blade of the well-known up and down moving type focal plane shutter shown in FIG. 6.

In the shutter shown, only the opening curtain is shown and the closing curtain is not shown. A first blade 121 is rotatably connected to arms 124 and 125 by pins 122 and 123. The arms 124 and 125 are pivotable about shafts 101 and 102, respectively, studded in a shutter base plate 100. The pins 122, 123 and shafts 101, 102 together form substantially a parallelogram and therefore, in accordance with pivital movement of the arms 124 and 125, the first blade 121 parallel-moves longitudinally of an aperture 103 for exposure. An arm 104 having a pin 105 studded therein is rotatably supported on the shaft 101. A pin 126 studded in the first blade 121 is rotatably coupled to a second blade 131, and a cam slot 132 engaged by the pin 105 is formed in the base of the second blade 131. Therefore, movement of the second blade 131 is caused by the pins 126 and 105 and is determined by the shape of the cam slot 132. A third blade 141 is rotatably supported on the shaft 102, and a cam slot 142 engaged by the pin 105 is formed in the base of the third blade. A fourth blade 151 and a fifth blade 161 are rotatably supported on the shaft 102 in a similar manner, and cam slots 152 and 162 engaged by the pin 105 are formed in the fourth and fifth blades, respectively. The cam slots 132-162 of the blades are designed such that the blades spread out to cover the aperture when the first blade 121 is positioned above the aperture 103 as viewed in FIG. 6 and that almost all of the blades overlap one another when the first blade 121 is retracted below the aperture 103.

The first blade 121 cooperates one of the blades of the closing curtain, not shown, to form a slit for exposure and among the one set of blades, it has the longest movement distance and receives the greatest shock at the start and end of the movement. Accordingly, this blade must be not only light in weight but also provided with sufficient mechanical strength, and as previously described, the blade of Embodiment 3 sufficiently satisfies such requirement. Also, where the blade is constructed with chemically stable ceramics as the outer layers, deterioration of the properties thereof by the environmental conditions hardly occurs and the planarity thereof is maintained unchanged.

As the method whereby the pins 122, 123 and 126 are studded in the first blade 121, it is most popular to caulk metal pins, but pins of ceramics similar in quality to the outer sheets may be made integrally with the outer sheets in advance. To enhance the strength of the portions in which the pins are studded, only those portions of the outer sheets can be made thicker for reinforcement. One of the hollow portions of the inner sheet may be made to serve also as the small hole for studding the pin. The second blade 131, the third blade 141, the fourth blade 151 and the fifth blade 161 have respective cam slots and wear resistance is required of the inner walls of these slots, and in this point also, ceramics are advantageous.

Embodiment 7

In the focal plane shutter of Embodiment 6, the sheet member according to Embodiment 3 is used as the first blade 121, while the sheet member according to Embodiment 1 is used as each of the second to fifth blades 131-161. In FIGS. 7A and 7B, one of the second to fifth blades, 221, is shown as a typical blade. The blade 221 is formed with a small hole 223 for studding a pin therein and a cam slot 224, and this blade comprises a member 224 integrally forming one outer layer and the inner layer and a member 225 similar thereto which forms the other outer layer.

Embodiment 8

In the focal plane shutter of Embodiment 6, the sheet member according to Embodiment 3 is used as the first blade 121, while the blade shown in FIGS. 8A and 8B is used as each of the second to fifth blades 131-161.

The light-intercepting blade 321 is made of a "composite sheet member having hollow structures therein" which uses a substance abundant in light-intercepting property as outer layers 325 and 326 and a thinned substance of a high relative modulus of elasticity as inner layer 327. Such a composite sheet member is made by using polyolefine resin such as polyethylene, polypropylene or polybutylene, polyethylene terephthalate, polybutylene terephthalate or polyamide for the outer sheets and using carbon film for the inner sheet. The inner sheet is made into a sheet-like form by the CVD or PVD method and thinned by machining or leaser processing, and then covered with the outer sheets. If the outer sheets alone are deficient in light-intercepting ability, they may be dyed or filled with carbon particles or the like to enhance the light-intercepting property thereof.

The blade 321 made in this manner has a high strength of the inner layer and therefore permits the driving by the studding or insertion of pins without being reinforced.

Also, the machining of small holes and cam slots is easy as compared with the blade of FIG. 3 and the wear resistance of the inner walls of the cam slots is great. The second to fifth blades, as compared with the first blade, have a short movement distance and receive a small shock. Accordingly, even if the ratio of flexural rigidity to density is more or less great, there is an advantage in function and manufacture and therefore, a blade like that of the present embodiment is also usable.

We claim:

1. In a photographic device, a planar light-intercepting blade adapted to be moved in the direction of a surface, thereof at a position across the optical path of said photographic device to thereby control the quantity of light passing through said optical path, said blade comprising:

a pair of outer layers forming the outer surfaces of said blades; and an inner layer formed between said outer layers and having a number of spaces therein.

2. The light-intercepting blade according to claim 1, wherein said inner layer includes a number of ribs spaced in the direction of said surface to form said number of spaces between said ribs.

3. The light-intercepting blade according to claim 1, including a first sheet member forming one of said pair of outer layers and said inner layer and a second sheet member forming the other of said pair of outer layers and joined to said first sheet member, said first sheet member having a number of recesses formed in the surface thereof joined to said second sheet member.

4. The light-intercepting blade according to claim 3, wherein said first sheet member and said second sheet member are formed of the same substance.

5. The light-intercepting blade according to claim 3, wherein said first sheet member and said second sheet member are formed of different substances containing a common element.

6. The light-intercepting blade according to claim 1, including a first sheet member forming one of said pair of outer layers, a second sheet member forming said inner layer and joined to said first sheet member, and a third sheet member forming the other of said pairs of outer layers and joined to said second sheet member, said second sheet member being formed of a substance different from both of said first sheet member and said third sheet member.

7. The light-intercepting blade according to claim 6, wherein said second sheet member is formed with a number of holes extending therethrough from the surface thereof joined to said first sheet member to the surface thereof joined to said third sheet member.

8. The light-intercepting blade according to claim 6, wherein said second sheet member is formed of a substance having a low density relative to said first and third sheet members.

9. The light-intercepting blade according to claim 6, wherein said first and third sheet members are formed of a substance having a high relative modulus of elasticity relative to said second sheet member.

10. The light-intercepting blade according to claim 1, including an inner sheet member forming said inner layer and an outer sheet member joined to the opposite sides of said inner sheet member to thereby form said pair of outer layers, at least one of said inner sheet member and said outer sheet member being formed of resin reinforced by carbon fiber.

11. The light-intercepting blade according to claim 10, wherein said inner sheet member is formed of said resin reinforced by carbon fiber and said outer sheet member is formed of a metal.

12. The light-intercepting blade according to claim 10, wherein said inner sheet member is formed of a metal and said outer sheet member is formed of said resin reinforced by carbon fiber.

13. The light-intercepting blade according to claim 10, wherein said inner sheet member is formed of plastics and said outer sheet member is formed of said resin reinforced by carbon fiber.

14. In a focal plane shutter device of a camera having a plurality of light-intercepting blades spread out from their overlapped position to close an aperture for exposure, each of said light-intercepting blades comprising:

a pair of outer layers forming the outer surfaces of said blade; and an inner layer formed between said outer layers and having a number of spaces therein.

15. The device according to claim 14, including a first light-intercepting blade displaceable by the greatest distance for said spread-out to thereby close a portion of said aperture and at least one other light-intercepting blade displaceable by a distance smaller than the movement distance of said first light-intercepting blade to thereby close the remaining portion of said aperture, each of said plurality of light-intercepting blades including an inner sheet member forming said inner layer and an outer sheet member joined to the opposite sides of said inner sheet member to thereby form said pair of outer layers, said inner sheet member of said first light-intercepting blade being formed of a substance having a low density relative to said outer sheet member.

16. The device according to claim 15, wherein the inner sheet member of said other light-intercepting blade is formed of a substance having a higher relative modulus of elasticity than the outer sheet member thereof.

* * * * *

UNITED STATES PATENT AND TRADEMARK OFFICE
CERTIFICATE OF CORRECTION

PATENT NO. : 4,482,231

DATED : November 13, 1984

INVENTOR(S) : HIRONOBU KATO, ET AL.

It is certified that error appears in the above-identified patent and that said Letters Patent is hereby corrected as shown below:

Column 1, line 61, change "movement" to --moment--;

line 65, change "it" to --Iz--.

Column 4, line 20, change "Same" to --outer--.

Column 6, line 63, delete "lubricative"; same line, after "black" insert --lubricating--.

Column 7, line 36, change "pivital" to --pivotal--.

*Signed and Sealed this*

*Thirteenth* Day of *August 1985*

[SEAL]

*Attest:*

DONALD J. QUIGG

*Attesting Officer*     *Acting Commissioner of Patents and Trademarks*